US009111293B2

(12) United States Patent
Gupta et al.

(10) Patent No.: US 9,111,293 B2
(45) Date of Patent: Aug. 18, 2015

(54) MOBILE LOCATION AND TIME SENSITIVE MESSAGING PLATFORM

(71) Applicants: Piyush Gupta, Fremont, CA (US); Manish Dinkarrao Kulkarni, Pleasanton, CA (US)

(72) Inventors: Piyush Gupta, Fremont, CA (US); Manish Dinkarrao Kulkarni, Pleasanton, CA (US)

(*) Notice: Subject to any disclaimer, the term of this patent is extended or adjusted under 35 U.S.C. 154(b) by 12 days.

(21) Appl. No.: 13/845,083

(22) Filed: Mar. 17, 2013

(65) Prior Publication Data
US 2014/0111355 A1    Apr. 24, 2014

Related U.S. Application Data

(60) Provisional application No. 61/612,318, filed on Mar. 18, 2012.

(51) Int. Cl.
G08G 1/00    (2006.01)
G06Q 30/02   (2012.01)

(52) U.S. Cl.
CPC .................... *G06Q 30/0241* (2013.01)

(58) Field of Classification Search
CPC .......... G06Q 30/0241; G06Q 30/0261; G06Q 30/0266; G06Q 30/0265; G06Q 30/0273
USPC ....... 340/901, 988, 425.5, 463, 990; 705/14.4, 14.68; 40/591
See application file for complete search history.

(56) References Cited

U.S. PATENT DOCUMENTS

| | | | | |
|---|---|---|---|---|
| 6,060,993 A | * | 5/2000 | Cohen | 340/691.6 |
| 2004/0036622 A1 | * | 2/2004 | Dukach et al. | 340/691.6 |
| 2007/0198442 A1 | * | 8/2007 | Horn | 705/500 |
| 2011/0106595 A1 | * | 5/2011 | Vande Velde | 705/14.4 |
| 2011/0191172 A1 | * | 8/2011 | Hostvedt et al. | 705/14.49 |
| 2011/0295697 A1 | * | 12/2011 | Boston et al. | 705/14.68 |
| 2013/0091016 A1 | * | 4/2013 | Shutter | 705/14.58 |

* cited by examiner

Primary Examiner — Phung Nguyen

(57) ABSTRACT

We hereby report a location specific mobile messaging system. These messages could be displayed (by way of example but not by limitation) in a location viewable by a variety of people. The contents of these messages could be programmed to display messages specific to a location.

20 Claims, 4 Drawing Sheets

MOBILE LOCATION AND TIME SENSITIVE MESSAGING PLATFORM

CROSS REFERENCE TO RELATED APPLICATIONS

This patent application claims the priority filing date of the provisional U.S. patent application (Application No. 61/612,318) titled "Mobile Location and Time Sensitive Messaging Platform," filed on Mar. 18, 2012 by the inventors Piyush Gupta and Manish D. Kulkarni. This benefit is claimed under 35. U. S. C. $119 and the entire disclosure of the Provisional U.S. patent Application No. 61/612,318 is incorporated here by reference.

FIELD OF TECHNOLOGY

This application relates to a system, method and location specific mobile messaging system. These messages could be displayed in a location viewable by a variety of people. The contents of these messages could be programmed to display messages specific to a location.

BACKGROUND

The messages (by way of example, but not by limitation) could be displayed on the front or back bumper of a vehicle or any other place back of a vehicle. These messages could be displayed on a flat panel display by way of example, but not by limitation. These flat panel displays could be robust to sustain variable weather conditions.

However, these displays can also access wireless network to obtain location information. The wireless network could access cell phone networks by way of example but not by limitation. The wireless network could also access radio towers of the network to obtain display location. The wireless network could also access satellite based positioning or navigation system such as GPS (global positioning system) or Galileo.

The location determination system could be a combination of radio tower based system and satellite based positioning system. The location determination system could alternatively access cell-information (or identification) of a wireless network, The location determination system could alternatively determine locations using installed components of a network. These components could be routers, towers, or other relevant components.

Such a system could consist of a method to transmit message to display devices specific to a verity of locations. This method includes a coordinating unit to transmit specific messages.

There could be a database matching various locations and the corresponding messages. These messages could be purely informational (such as traffic alert system or disaster alert system) or educational. These messages could also be of commercial or advertising nature.

These messages could consist of voice, text or picture. It could be any combination of two or all three components. The messages could be static or dynamic. The messages could be an animation or a movie or combination of text and animation/movie.

The display system could be flat screen display such as a liquid crystal display (LCD) or a Light emitting diode (LED) based display. The display system could be a screen of a tablet or a phone screen or a similar device. The display system could be mono-chrome or a multi-color.

The display system could be weather resistant to withstand adverse weather conditions.

The display system could be anchored securely for minimizing risk of theft. The display system would have location-indicating features (such as satellite based positioning system) in the event the display is stolen.

In an embodiment of the invention, the display system could be mounted on a car public viewing.

In another embodiment of the invention, the display system could be thin paper-like object. This paper-like object could have sticking properties.

SUMMARY

Location based mobile device will display traffic or advertising or any other kind of information for drivers or pedestrians.

Information may change with the location of the vehicle on which device is installed.

Information display on the mobile device can be changed from a web panel.

DETAILED DESCRIPTION

Mobile location and time sensitive messaging platform will display traffic, public safety or advertisement information. A thin screen, which will also have transmitter as well as receiver, processor, solar panel, memory attach to it will be used to display traffic, public safety and advertisement information. Users of the platform will be able to edit their information, which they want to display on other people's vehicle's screen.

Figure 1:
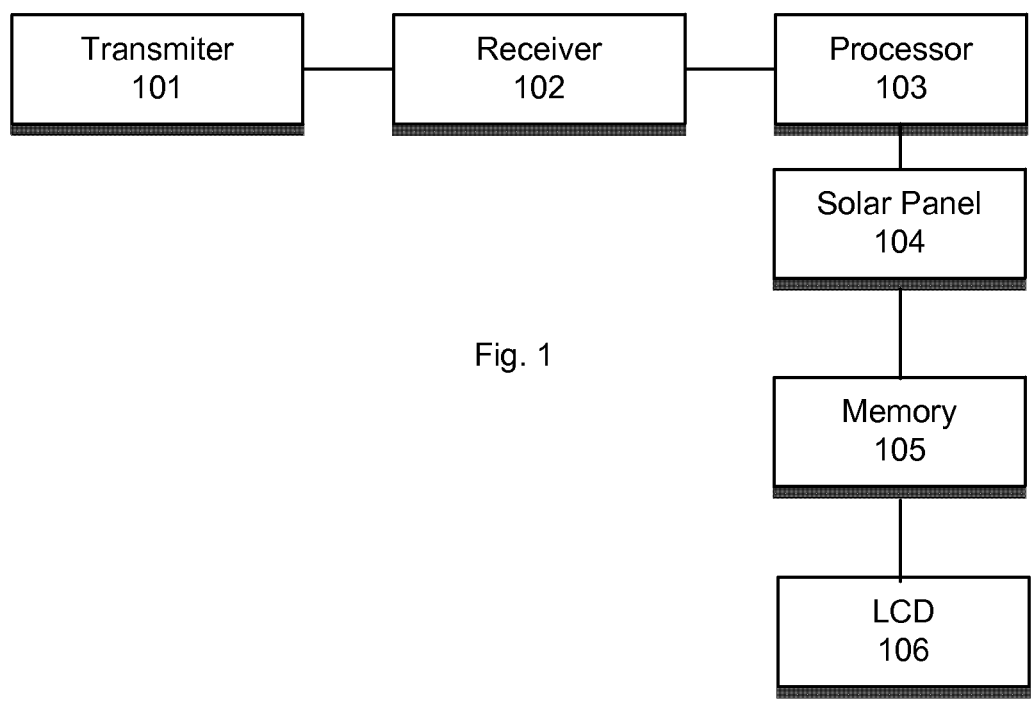
FIG. 1 is a block diagram of the component used in the device. Transmitter will transmit location of the vehicle to a central server which will receive the data from the transmitter. Processor will process information it received as well as fetch information from the flat files or database to display on the screen. Solar panel will provide power to the circuit and LCD screen. Some necessary information will be saved in the memory. Screen will display traffic information or advertisement or any some kind of useful information.
Figure 2:
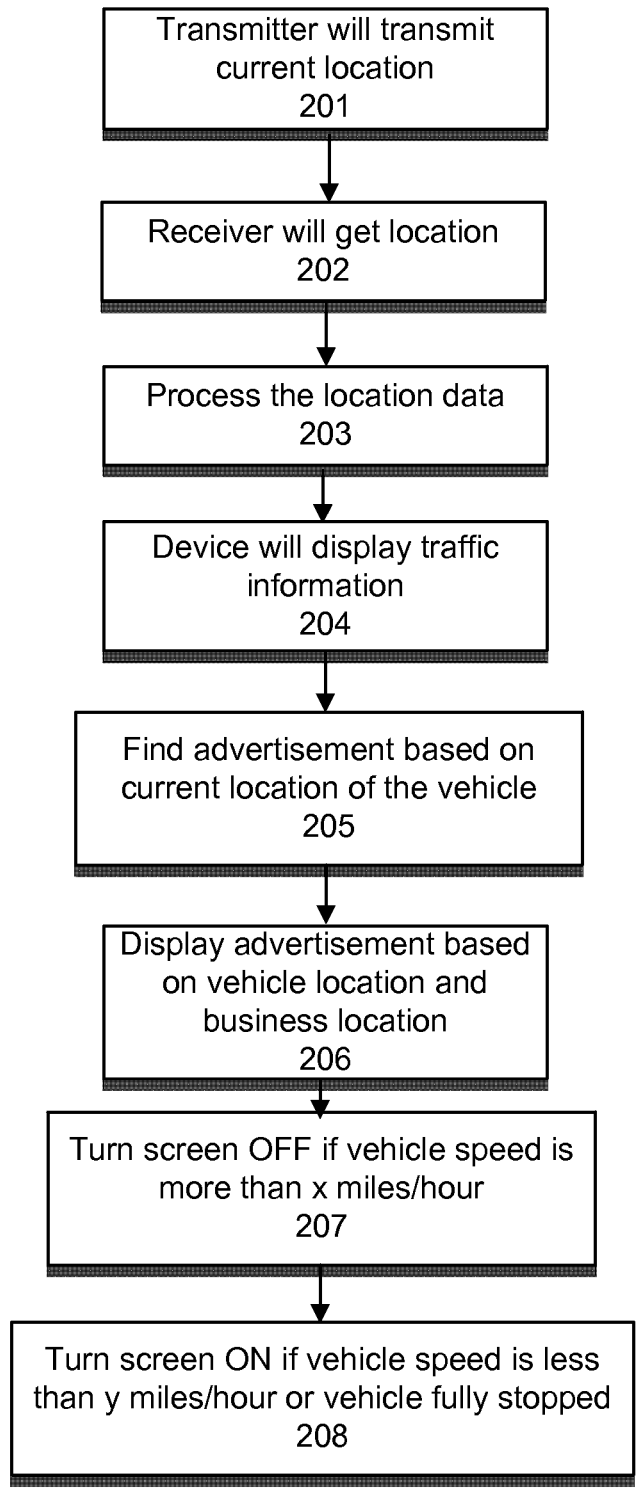
FIG. 2 is a block diagram about the functioning or control of the device. Location received from the transmitter will be processed by processor and display some relevant traffic related or business related or some information which can be beneficial for the public will be displayed on the LCD screen.

FIG. 2 is a block diagram about the functioning or control of the device. The flowchart describes various steps in the system. The step 201 is for transmitting the current location by the transmitter. The step 202 is for receiving the location by the receiver at the central server. The step 203 is for processing the location data. The step 204 is for displaying the traffic information on the device. The step 205 is for finding an advertisement based on the current location of the vehicle.

The step 206 is for displaying the advertisement based on the vehicle location and the business location. The step 207 is for turning the screen off if the vehicle speed is more than a threshold speed (e.g., x miles/hour). The step 208 is for turning the screen on if the vehicle speed is less than another threshold speed (e.g., y miles/hour) or when the vehicle is fully stopped. Therefore, in the message display-system proposed in the present invention, the screen gets turned off if the vehicle speed is more than a threshold speed (denoted by the variable x miles/hour); and the screen further gets turned on if the vehicle speed is less than another threshold speed (denoted by the variable y miles/hour) or if the vehicle is fully stopped.

Figure 3:
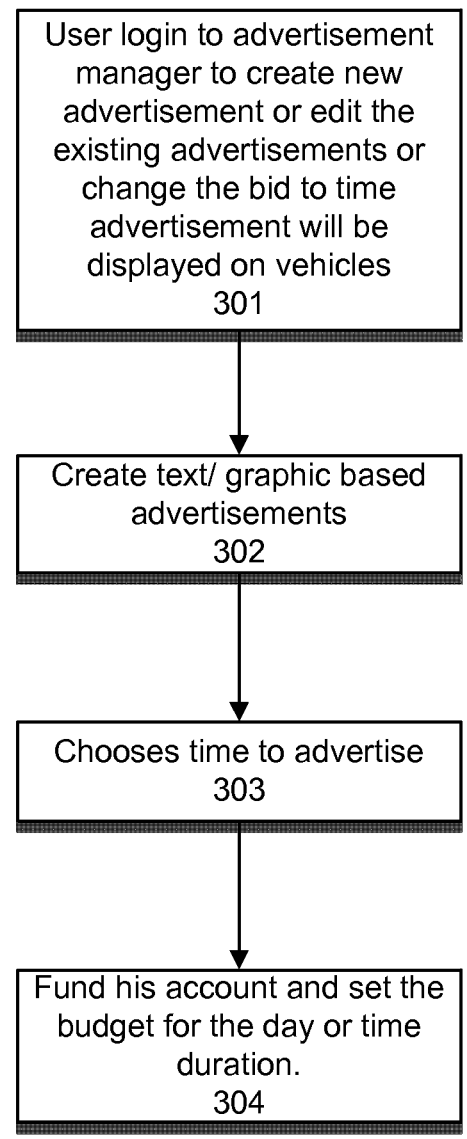
FIG. 3 is a block diagram about functionality of control panel. Users of the platform can login to a web platform and submit text or graphic advertisements or any other information they want to display on the screen attached behind the vehicle. They can select time when they want to display that information.
Figure 4:
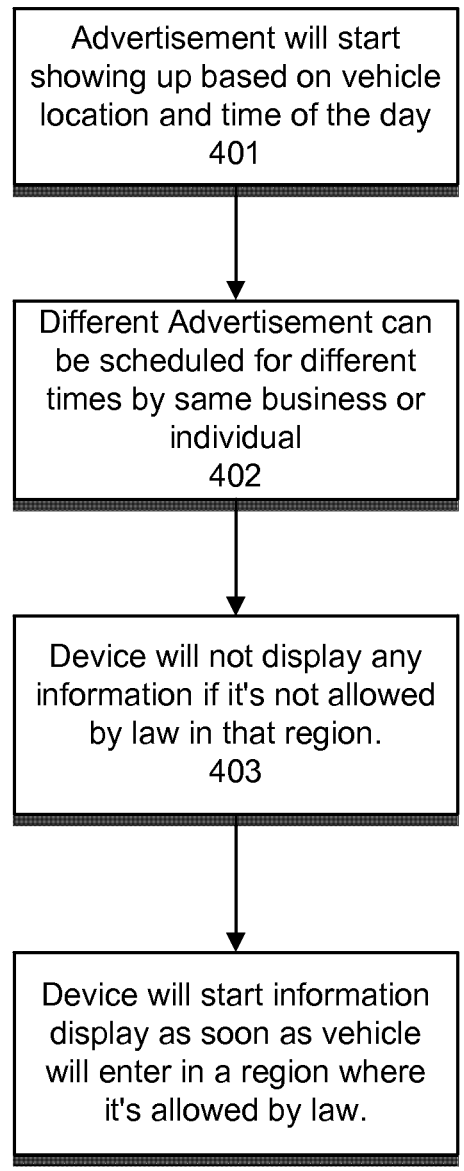
FIG. 4 is a block diagram about advertisement display on device. Advertisement will start showing up on the screen as soon as vehicle will enter in the region where they are allowed by law else screen will go in sleep mode.

FIG. 3 is a block diagram about functionality of control panel. In step 301, the user or advertiser can login to the advertisement manager to create a new advertisement or edit the existing advertisements or change the bid to time the advertisement to be displayed on vehicles. In step 302 the advertiser can create text and/or graphic based advertisements. In step 303 the advertiser or user can choose a time to advertise. In step 304, the advertiser can fund an advertising account and can set a budget for a time duration or for a given day.

What is claimed is:

1. A message display-system to broadcast location sensitive information comprising of
   a flat screen display mounted on the back bumper of a vehicle;
   wherein the display system is weather resistant to withstand adverse weather conditions;
   the locations are determined using a satellite based positioning system;
   the system further comprises of a solar panel to provide power to the screen;
   the displayed information is also sensitive to time;
   the screen gets turned off if the vehicle speed is more than a threshold speed;
   the screen further gets turned on if the vehicle speed is less than another threshold speed;
   wherein the system will not display any information if it's not allowed by the law in that region;
   and starts information display as soon as the vehicle enters a region where it's allowed by the law.

2. The system of claim 1 wherein the screen gets turned on if the vehicle is fully stopped.

3. The system of claim 1 wherein the display is anchored securely to the vehicle for minimizing the risk of theft.

4. The system of claim 1 wherein the message comprises of voice.

5. The system of claim 1 wherein the message comprises of text.

6. The system of claim 1 wherein the message comprises of pictures.

7. The system of claim 1 wherein the message comprises of animations.

8. The system of claim 1 wherein the messages are displayed on the front of the vehicle.

9. The system of claim 1 wherein the display system is a thin paper-like object.

10. The system of claim 1 wherein the paper-like object has sticking properties.

11. The system of claim 1 wherein the locations are determined by accessing cell phone networks.

12. The system of claim 1 wherein different advertisements are scheduled for different times by an advertiser.

13. The system of claim 1 wherein the existing advertisements are edited to time the advertisements to be displayed on vehicles.

14. The system of claim 1 wherein an advertiser funds an advertising account and sets a budget for a time duration.

15. A method for displaying location and time sensitive information for the consumption of public, comprising:
   determining the locations using a combination of radio tower based system and a satellite based positioning system; and
   mounting a weather resistant screen display on the back bumper of a vehicle;
   turning the screen off if the vehicle speed is more than a threshold speed;
   turning the screen on if the vehicle speed is less than another threshold speed; displaying information sensitive to time;
   wherein the device not displaying any information if it's not allowed by the law in that region;
   and the device displaying information as soon as the vehicle enters a region where it's allowed by the law.

16. The method of claim 15 further securely anchoring the display to the vehicle for minimizing the risk of theft.

17. The method of claim 15 further making the display robust to sustain variable weather conditions.

18. A location specific mobile messaging system comprising of
   messages displayed in a location viewable by a variety of people;
   the contents of these messages are programmed to display the messages specific to a location;
   these messages are displayed on a flat panel display;
   the flat panel display is robust to sustain variable weather conditions;
   the display accesses a wireless network to obtain the location information;
   the system further comprises of a database matching various locations and the corresponding messages;
   the display is mounted on a car for public viewing;
   the power is provided to the display screen using a solar panel;
   wherein the system will not display any information if it's not allowed by the law in the region; and
   the system will start information display as soon as the car enters a region where it's allowed by the law.

19. The system of claim 18, where the system comprises of location-indicating features in the event the display is stolen.

20. The system of claim 18, wherein the displayed information is at least one of traffic, disaster, educational, public safety, business, commercial and advertisement information.

* * * * *